INVENTOR
Norman C. Williams

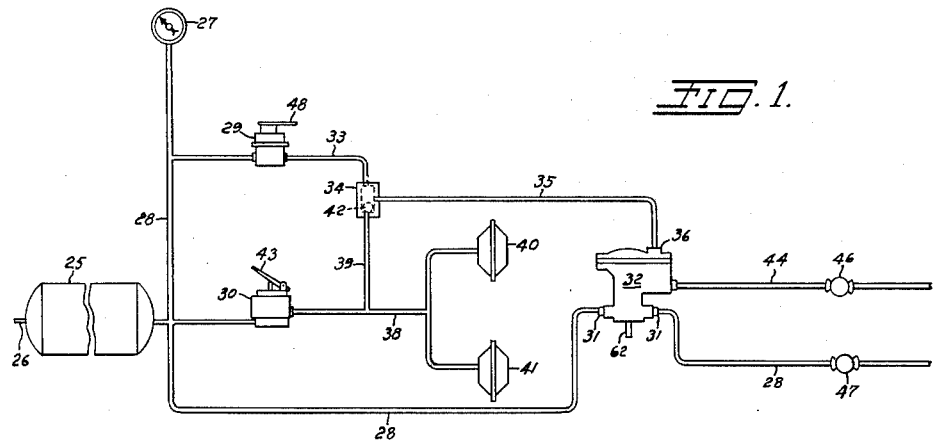

AGENT

Jan. 23, 1962 N. C. WILLIAMS 3,018,136
ADJUSTABLE DIFFERENTIAL AIR PRESSURE RELAY
Filed March 21, 1960 3 Sheets-Sheet 3

INVENTOR
Norman C. Williams
BY
AGENT

United States Patent Office 3,018,136
Patented Jan. 23, 1962

3,018,136
ADJUSTABLE DIFFERENTIAL AIR PRESSURE RELAY
Norman C. Williams, Portland, Oreg., assignor to Power Brake Equipment Company, a corporation of Oregon
Filed Mar. 21, 1960, Ser. No. 16,276
17 Claims. (Cl. 303—6)

This invention relates generally to an air brake system for an automotive train having at least a forward transverse axle and a rearward transverse axle with a supporting wheel at each end of each of said axles, an individual air brake for each of said wheels and means for supplying operating air to said brakes as desired.

It is common in trains of this type to include a leading truck having an air storage tank and an air compressor driven by the truck engine to maintain the air pressure in the tank in response to an air pressure governor and having a truck operator controlled air pressure modulating means for supplying air under pressure from said tank to the brake operators as required.

Such an automotive train may comprise only a truck with a front axle and a rear axle or a truck with a semi-trailer having a front truck axle, one or more rear truck axles and one or more semi-trailer axles, or the train may additionally include a trailer with a forward axle and a rearward axle. Whatever the make-up of the train, the condition of the brake linings and drum surfaces, the condition of the air lines, the condition of the tires, the distribution of the load on the train, road conditions and other conditions will add up to a driving "feel" which will make it desirable to vary the brake air presure at one end of the train, with respect to the other.

For instance, an unloaded single truck may want sixty percent of its braking effort on the front wheels because of the better traction the engine weight will give the front wheels while if the truck is loaded the rear wheels can be relied upon for greater traction and more air pressure should be used there.

Again if a trailer is heavily loaded or if the tires are new its brakes can be relied upon to have better road surface traction and can be given more air pressure to obtain more trustworthy additional braking effect to make possible a substantial increase in safe train speed or to give greater anti-jackknife assurance to the train.

Many of the above noted brake conditions will change during a long or short trip and it is highly desirable for the driver of the train to have at his command some simple and easily adjusted means for changing the ratio of the air pressure as applied to the two ends of the truck or the train.

This invention refers particularly to air relay means adaptable to the above described necessity.

It is a primary object of this invention to provide for an air brake system of an automotive truck or train having a forward grouping and a rearward grouping of supporting wheels and brakes with a single source of brake operating air available to the air lines of the two groups of brakes, a differential air pressure relay to be placed in the line supplying operating air to the rearward group of brakes and to be piloted by the air pressure in the line supplying operating air to the forward group of brakes to vary the ratio of the pressures of the air supplied to the two brake groupings as desired.

It is a second object to provide such a brake system with such a differential air pressure relay including means for adjusting the differential of the pilot and output pressures of the relay.

It is a third object to provide for such a brake system such a differential air pressure relay including simple and reliable one motion means for resetting the differential of the pilot and output pressures of the relay.

It is a fourth object to provide such a relay with remote control means operable by the truck operator even when the truck is in motion for resetting the differential of operating air supplied to the forward wheel brakes to the operating air supplied to the rearward wheel brakes.

How these and other objects are attained is explained in the following description referring to the attached drawing in which:

FIG. 1 is a schematic drawing of an air brake system simplified to show only the control elements required to illustrate the utility of my adjustable differential air relay in the system.

FIG. 2 is a fragmental elevation drawing, shown in partial section, of my adjustable differential air relay as adjusted to give an output pressure greater than the input pilot pressure.

Like reference numerals refer to like parts in the several figures of the drawing.

Figure 3:
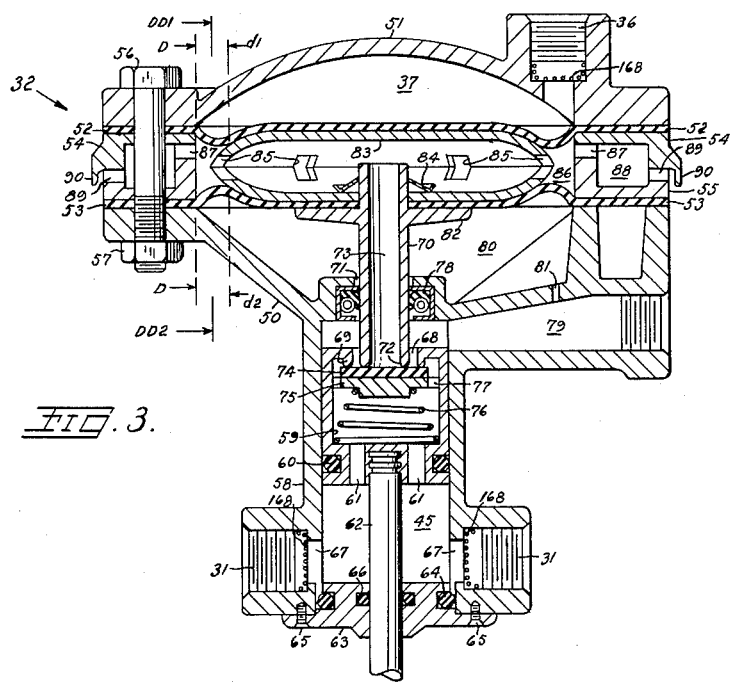
FIG. 3 is a fragmental elevation drawing, shown in partial section, of my relay as adjusted to give an output pressure the same as the input pilot pressure.

In FIG. 1 is shown a storage tank 25 for brake operating air under pressure received therein at 26 through a one-way check valve, not shown, from an air compressor, not shown, driven by the truck engine, not shown. An air governor, not shown, controls the compressor to maintain in the tank the desired air pressure, as shown on dial 27. The so-called "emergency" air line 28 is seen to connect tank 25 with "modulating" or "reactionary" manually operated brake air throttle valve 29, modulating or reactionary pedal operated brake air throttle valve 30, and with the emergency air inlet 31 of my here first disclosed adjustable differential air pressure relay 32.

Hand throttle valve 29 supplies pilot air at modulated pressure through air line 33, two way ball check valve 34 and pilot line 35 to entrance 36 into pilot air pressure chamber 37 of relay 32.

Foot throttle valve 30 through line 38 supplies operating air at modulated pressure in parallel to forward brake applying air motors 40, 41 and at the same time supplies pilot air at modulated pressure through line 39, two way ball check valve 34 and pilot line 35 to entrance 36 of relay 32. Ball 42 in two way check valve 34 is always prevented from seating against the entrance to line 35 by construction but will seat against and check return flow into either line 33 or 39 depending on which line includes air at the lower pressure.

That is to say if pedal 43 of throttle valve 30 is depressed the forward brake operators 40, 41 will be energized to apply the forward brakes and pilot air through line 39, check valve 34 and pilot line 35 will activate service line 44 through relay 32 to operate a rearward relay (not shown) to energize the rearward brake operators, not shown, like 40, 41. Full pressure air line 28 is continuous through relay 32 between its inlet 31 and outlet 31 and is open in relay 32 to an inlet air space 45, see FIG. 2.

Hand manipulated air conduit couplings 46 and 47 are shown in lines 44 and 28 to indicate that if the lines pass between separable vehicles, obviously they will have to be opened if the vehicles are separated; however plumbing details of this kind are well known in the art. It is enough here to say that in the present simplified showing when the system brakes are required the forward brakes as well as the rearward brakes are controlled by foot pedal 43 while if only the rearward brakes are to be applied hand lever 48 of hand throttle 29 is used.

The present invention includes the conception of the need of a differential pressure relay 32 in an air brake system such as that typified by FIG. 1. An understanding of the unusually fortunate functional as well as structural design of relay 32 can be obtained from FIGS. 2 to 5 incl.

Referring now to FIGS. 2 to 5, the relay 32 is seen to include a body casting 50, and a cover casting 51 spaced by an upper diaphragm 52, a lower diaphragm 53, a pair of annular castings 54, 55, forming an exhaust manifold and of these castings secured in place by bolts like 56 and nuts 57.

Body casting 50 at its lower end is formed with an axially disposed cylinder 58 to receive axially slidably therein valve support barrel 59 sealed to the interior surface of cylinder 58 by O ring 60. The lower end of barrel 59 is perforated by air holes 61 and has the upper end of valve barrel positioning rod 62 secured axially therein as shown. Sealing the lower end of cylinder 58 of body casting 50 is cover disk 63 sealed to cylinder 58 by O ring 64, secured to cylinder 58 by screws 65 and slidingly sealed to stem 62 by O ring 66. Ports 67 through the wall of cylinder 58 connect inlet openings 31 guarded by screens 168 with operating air inlet space 45.

The upper end of valve barrel 59 is formed with a main valve port 68 axially therethrough. Main valve seat 69 is formed within barrel 59 at the inner end of port 68. Hollow valve stem 70 forming exhaust port 73 is seen to extend downwardly into cylinder 58 through an axial opening 71 and through main valve port 68 into valve barrel 59 where the exhaust valve seat 72 formed on the lower end of stem 70 contacts valve disk 74 supported upwardly toward both main valve seat 69 and exhaust valve seat 72 by cap 75 of spring 76 resting on the interior bottom of barrel 59. Circumferential teeth 77 of cap 75 pass air from space 45 and holes 61 to main valve 69, 74. Air seal 78 both guides valve stem 70 and limits the transfer of air between brake control air space 79 and its reaction space 80 to the air bleed hole 81.

Flexible diaphragm 53 with a central hole therethrough is seen to be placed over the upper end of valve stem 70 to rest on collar 82 thereof and to be held thereon by hollow diaphragm plate 83 and spring washer 84. For ease of construction and assembly diaphragm plate is made of two saucer-like halves secured together after the lower half is secured to stem 70.

The hollow form of diaphragm plate 83 has the advantage of providing with annular castings 54, 55 a protected exhaust outlet space which communicates with the atmosphere through holes 85 in plate 83, space 86 between diaphragms 52, 53, inlet holes 87 from space 86 to annular space 88 between rings 54, 55 and outlet holes 89 between space 88 and atmosphere. Holes 87, 89 are between teeth cast on the upper surfaces of ring 55 and outlet holes 89 are protected at their outer ends by annular awning 90 cast onto ring 54.

It is apparent that in the practice of the present invention diaphragm plate 83 could as well be solid and exhaust port could be led to atmosphere through another wall through which stem 70 would be slidingly sealed.

The particular novelty and present usefulness of the relay 32 structure to the present invention resides first in the attachment of the operating stem 70 of the overlapping valves 69, 74 and 72, 74 to the diaphragm plate 83 between the relaxed diaphragms 52, 53 and second in the provision of means like rod 62 for axially positioning valve barrel 59, axially to position as desired the center plane of diaphragm plate 83 with respect to the planes of the two diaphragms.

In explanation of the operation of the novel relay of this invention in the novel system in which it is here used it should be remembered that it is a principal purpose of the system to make it possible for the driver of an automotive vehicle or train of vehicles to vary, without moving from his driving position, the ratio of the braking effort exerted on the rear group of wheels of his truck or train to the braking effort exerted on the front group of wheels thereof.

Figure 4:
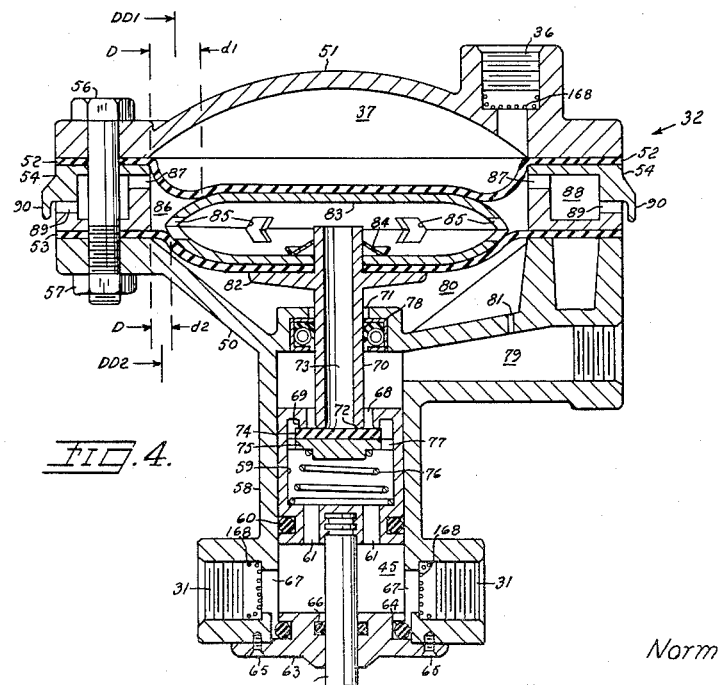
FIG. 4 is a fragmental elevation drawing, shown in partial section, of my relay as adjusted to give an output pressure less than the input pilot pressure.

It must also be remembered that the effective diameter of a circular flexible diaphragm secured at its circumference and supported on a central circular stiff plate is the mean of rigid diameters of the diaphragm at its outer support and at its outer support on the plate. Therefore the greater the diameter of outmost contact of the diaphragm with the central plate the greater the effective diameter of the diaphragm. Referring now to FIG. 3, it is seen that the center plane of diaphragm plate 83 is midway between the mounting planes of diaphragms 52 and 53. Therefore, the outer contact diameters $d1$ and $d2$ of diaphragms 52 and 53 with plate 83 are equal and the mean effective diameters DD1 and DD2 are equal. In the case of FIG. 3, it would take the same air pressure, p.s.i., in reaction air space 80 to balance the pilot air pressure, p.s.i., in space 37 to hold valve stem 70 axially inactive. Now similarly referring to FIG. 2, it is seen that the center plane of diaphragm plate 83 is much nearer the mounting plane of diaphragm 52 than it is to the mounting plane of diaphragm 53 and the effective diameter DD1 of diaphragm 52 is greater than the effective diameter DD2 of diaphragm 53. In the case of FIG. 2, it would take a greater reaction air pressure, p.s.i., in space 80 in the ratio of diameters DD1 to DD2 to balance the pilot air pressure in space 37. And, again, with reference to FIG. 4, it is seen that the center plane of diaphragm plate 83 is much closer to the mounting plane of diaphragm 53 than it is to that of diaphragm 52 and the effective diameter DD1 of diaphragm 52 is less than the effective diameter DD2 of diaphragm 53. In the case of FIG. 4 it would take a lesser reaction air pressure, p.s.i., in space 80 in the ratio of diameters DD1 to DD2 to balance the pilot air pressure in space 37.

Referring again to FIGS. 1 and 2 with relay 32 connected as shown with emergency air line 28 connected through "hand" 47 to supply operating air to a relay, not shown, feeding the actuators of the rearward brakes and with line 44 connected through "hand" 46 to supply modulated control air to the control space of the relay (not shown) feeding the actuators of the rearward brakes, it is seen that the ratio of the brake actuator air pressure fed to the forward brake group 40, 41 through pipe 38 to the brake actuator air pressure fed to the rearward group, not shown, may be readily adjusted as desired by moving rod 62 longitudinally with valve barrel 59 to position valve 74 so that in its overlapped position of closure on both main valve seat 69 and exhaust valve seat 72, the longitudinal position of valve stem 70 with diaphragm plate 83 will give the ratio of diaphragm effective diameters DD1 to DD2 the desired pressure ratio of the lines 44 to 35.

Figure 5:
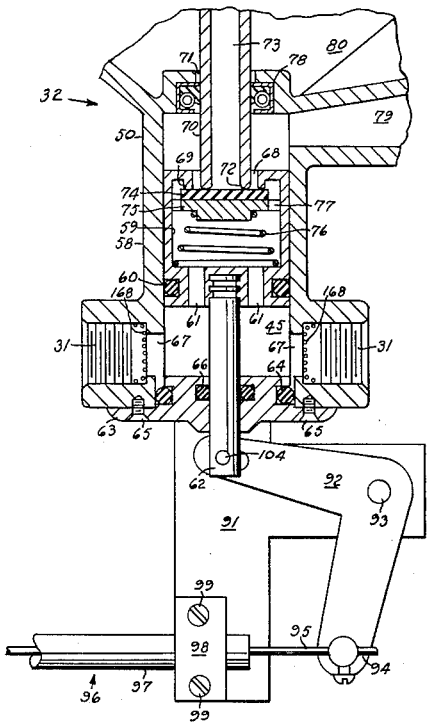
FIG. 5 is a lower end fragment of the FIG. 4 view with a bell crank and "Ahrens Cable" added to indicate the remote control thereof.

FIG. 5 showing a fragment of the valve 32 of FIGS. 1 to 5 shows schematically how a bracket 91 may be positioned with respect to body 50 of relay 32 so that a suitable bell crank 92 can be pivoted at 93 on bracket 91 with one end of bell crank 92 linked with rod 62 of relay 32 at 104 for axial movement with rod 62 and the other end of bell crank 92 secured to one end 94 of the slidingly carried internal wire 95 of Ahrens cable 96 the tunnel member 97 of which is secured to bracket 91 by clamp 98 and screws 99. The other end, not shown, of the Ahrens cable is conveniently mounted in the truck cab for ready manipulation by the driver.

Figure 6:
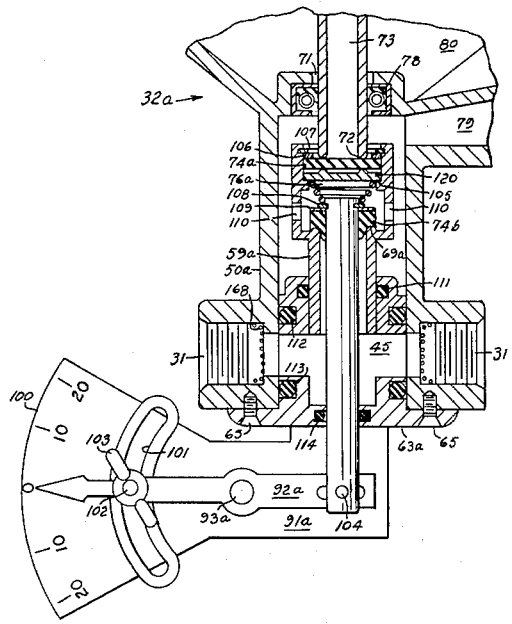
FIG. 6 is a lower end fragment similar to the FIG. 4 view but showing another form of overlapping valve mechanism in the relay and another form manual differential adjustment of the relay.

If it is not desired to manipulate the adjusting rod 62 except at the beginning of a trip when the truck is stopped and the driver can leave his cab, FIG. 6 shows how a bracket 91a can be positioned with respect to body 50a of relay 32a to pivot actuating and indicating lever 92a thereon at 93a. Bracket 91a is equipped with a dial 100 to indicate the longitudinal position of valve stem 70 and an arcuate slot 101 to receive locking bolt 102 which with wing nut 103 holds lever 92a in its set position and by pivot 104 maintains rod 60 in its desired position.

FIG. 6 also shows an optional form of valve barrel 59a into which at its upper end an exhaust valve disk 74a is confined between support disk 120 resting on shoulder 105 and washer 106 held down by snap ring 107. Main valve 74b carried around the top of adjusting rod 62 and prevented from moving upward therefrom by snap ring 108 and washer 109 is biased downwardly with rod 62 by spring 76a to seat on main valve seat 69a formed in barrel 59a as shown. Holes 110 in the wall of barrel 59a extend the space 79 to the interior of barrel 59a above main valve seat 69a. The lower outside surface of barrel 59a is slidingly sealed into lower end cover 63a by O-ring 111 and extends inlet space 45 in cover 63a up to main valve seat 69a. Cover 63a is secured to relay body 50a by screws 65 and sealed therein by O-rings 112 and 113. Adjusting rod 62 is slidingly guided axially through cover 63a by O-ring 114.

As was shown in FIGS. 2 to 5 in explaining the operation of the valve arrangement with valve barrel 59, the functional result of the axial movement of valve stem 70 is the same with valve barrel 59a in FIG. 6. In either case, moving valve stem 70 downward to close exhaust valve 72, 74 or 72, 74a, shuts air space 79 from exhaust port 73 and further downward movement of stem 70 opens main valve 69, 74 or 69a, 74a to connect space 45 to space 79. Or moving stem 70 upward first allows spring 76 or 76a to close main valve 69, 74 or 69a, 74a to shut space 79 from space 45 and then raises exhaust valve seat 72 from exhaust valve 74 or 74a to exhaust space 79 through port 73 to atmosphere. In either of the valve arrangements described the valves operate as overlapping since one of the main or exhaust valves can be open at one time.

Having thus recited some of the objects of my invention, illustrated and described a plurality of ways in which my invention may be practiced and explained their operation, I claim:

1. For use in an air brake system for an automotive train, a differential pressure air relay including in an axial line a main valve, an exhaust valve and a valve stem, said valves being overlappingly operable by one end of said stem on movement of said stem in one direction first to close one of said valves and then to open the other and in the other direction first to close the other of said valves and then to open the one, said relay including a pair of parallel supported spaced diaphragms with a parallel spaced diaphragm plate secured therebetween to move axially therewith in response to the differential of the opposed pressures applied to the opposite faces of said diaphragm plate by the outer faces of said diaphragms and means securing said plate to the other end of said stem to operate said valves to maintain said differential, said air relay including means for subjecting the outer face of one of said diaphragms to a pilot air pressure in a space and means for subjecting the outer face of the other of said diaphragms to the pressure of air required to be maintained a preset differential from said pilot air pressure, means adapting said main valve when open to admit air from a higher pressure source to said differential pressure space and said exhaust valve when open to bleed air from said differential pressure air space, means for inversely varying the effective diameters of said two diaphragms as said diaphragm plate is moved with said stem axially away from the midspaced position of said plate between the mounting planes of said diaphragms and said relay includes a valve barrel axially movable with said valves toward and away from said valve stem to vary said differential.

2. The relay of claim 1 in which said relay includes an adjustment means movable with said valve barrel coaxially with said stem to vary said differential.

3. The relay of claim 2 in which said adjustment means extends outside the case of said relay.

4. The relay of claim 3 in which said adjustment means extends remotely from said relay for remotely varying said differential.

5. An adjustable differential air pressure relay for use in an air brake system for an automotive train having a forward supporting wheel and a rearward supporting wheel, each of said wheels having an air brake with a respective air pressure actuator therefor, said system including a source of brake operating air under a normally substantially constant pressure and an air pressure modulating throttle valve for controlling the instantaneous pressure of the brake operating air passed therethrough from said air source to the brake actuator of one of said wheels, said relay being interposed between said throttle valve and the actuators of said wheel brakes to maintain a desired instantaneous differential pressure between the air applied to the actuator of one of said brakes and the air applied to the actuator of the other of said brakes and said relay including in axial alignment: a main valve, an exhaust valve and a valve stem; means including one end of said stem for overlappingly operating said valves on movement of said stem in one direction first to close said exhaust valves and then to open said main valve and on movement of said stem in the other direction first to close said main valve and then to open said exhaust valve; means forming a pilot air chamber for receiving pressure controlled air from said throttle valve; means forming a reaction air chamber for receiving reaction air passed by said main valve from a source thereof to said actuator of said other brake at a selected pressure differential to the pressure of air in said actuator of said one brake; said pilot air chamber and said reaction air chamber having parallel spaced adjacent walls formed of a pair of respective flexible diaphragms axially spaced by a diaphragm plate secured to the other end of said stem between said diaphragms; whereby a desired differential of the air pressures to be applied to said actuators of said brakes may be set by charging said air chambers to the desired pressure differential then moving said stem with said diaphragm plate axially of said chambers until the effective areas of the diaphragms on the two sides of said diaphragm plate are inversely proportional to the respective pressures of air in the respective chambers and the axial forces on said stem are balanced at which time said valves can be positioned axially of the lower end of said stem where both said valves are closed.

6. For use in an air brake system for an automotive train, a differential pressure air relay including in axial alignment a main valve, an exhaust valve and a valve stem, said valves being overlappingly operable by one end of said stem on movement of said stem in one direction first to close one of said valves and then to open the other and in the other direction first to close the other of said valves and then to open the one, said relay including a pair of spaced parallel circumferentially supported flexible diaphragms with a spaced parallel diaphragm plate secured therebetween for axial movement therewith in response to the differential of the opposed pressures applied to the outer faces of said diaphragms, means securing said plate to the other end of said stem to operate said valves to maintain said pressure differential, said relay including a hollow axially positionable valve barrel formed through its top wall with a main valve port having a main valve seat downwardly formed therearound, a main valve disk resiliently biased upwardly towards said main valve seat within said barrel, an exhaust valve seat being formed on the lower end of said stem to enter said barrel through said main valve port, an exhaust valve disk formed of a reduced diameter area of said main valve disk, and said relay including axially movable means secured to said barrel for axially positioning said barrel in said relay with respect to a selected axial position of said diaphragm plate to determine a selected differential between the opposing air pressures on the outer sides of said pair of diaphragms.

7. An adjustable differential air pressure relay comprising: a hollow body formed of a main body part, a coaxial cover part spaced from said body part by an upper coaxial diaphragm, a coaxial diaphragm spacing ring, a lower coaxial diaphragm and means securing said parts of said hollow body in axial alignment; a diaphragm plate about the thickness of said spacing ring and of lesser diameter than the inner diameter of said spacing ring, a valve stem secured coaxially to said lower diaphragm to move coaxially therewith; said cover part and said upper diaphragm forming a control air chamber therebetween in said hollow body; means forming an atmospheric opening through said spacing ring to an atmospheric space between said diaphragms; a first barrier means across the interior of said main body part dividing the interior thereof into a reaction air chamber between said lower diaphragm and said barrier and a valve chamber below said barrier; means slidingly sealing the exterior of said valve stem through said barrier; said valve stem having an exhaust port formed axially therein from the lower end thereof, an exhaust valve seat formed around the lower end thereof and air conduit means connecting said exhaust port to the atmosphere; a second barrier means spaced below said first barrier means in said valve chamber, said second barrier means being formed through its top wall with a main valve port having a main valve seat formed downwardly therearound; a main valve disk resiliently biased upwardly towards said main valve seat in said valve chamber, said main valve port being larger in diameter than said valve stem to pass said exhaust valve seat through said main valve port to strike said exhaust valve seat on said exhaust valve disk formed of a central area of said main valve disk and thereby close said exhaust valve seat and then lift said main valve disk from its seat; a control air inlet formed through an upper wall of said control air chamber, an operating air inlet formed through a lower wall in said valve chamber below said valve disk, a controlled air outlet formed through an upper wall in said valve chamber above said valve disk and a reaction air conduit formed through said first barrier from said valve chamber to said reaction air chamber, whereby when air at a selected control pressure is passed to said control chamber from its inlet said upper diaphragm will depress said diaphragm plate said lower diaphragm and said stem to close said exhaust valve seat on its disk and then open said main valve disk from its seat to pass operating air from its inlet in said valve chamber through said main valve to said controlled air outlet and said reaction air conduit to said reaction air chamber to react upwardly on the lower diaphragm against the downward action of the control air in the upper diaphragm until a desired differential pressure between the air in said control chamber and the air in said reaction chamber is maintained in accordance with the preset axial projected areas of contact of said diaphragms on said diaphragm plate.

8. The relay of claim 7 in which all of the movable parts are coaxial and each is movable axially on the one axis only.

9. The relay of claim 7 in which the interior wall of said valve chamber below said first barrier is cylindrical in form and said second barrier comprises a hollow axially positionable valve barrel formed through its top wall with said main valve port having said main valve seat downwardly formed therearound, said main valve disk being resiliently biased upwardly towards said main valve seat within said barrel, said main valve seat and said exhaust valve seat being in the common transverse plane of the working face of said valve disk when both said valves are closed and said barrel being axially slidably sealed to the interior of said valve chamber axially to position said barrel with respect to the centerplane between said diaphragms to preset the operating ratio between the pressure of said control air in said control air chamber to the reaction air at said controlled air outlet.

10. The relay of claim 9 including means for axially positioning said valve barrel to determine the ratio of the air pressures in said control air chamber and said reaction air chamber.

11. The relay of claim 10 in which said means for axially positioning said valve barrel extends through a wall of said valve chamber for remote control of the position of said barrel.

12. An adjustable differential air pressure relay comprising means forming an exhaust air valve and a main air valve, each of said valves including means forming a valve port ending in a valve seat, said valve seats being coaxial and radially spaced one from the other, one end of a coaxial operating stem for said valves having the valve seat of lesser radius formed thereon, a flat valve disk forming a common valve for both of said seats, resilient means biasing said valve disk coaxially towards said valve seats whereby one of said valves will be closed at all times and both will be closed when both the valve seats are in the transverse plane of the face of the valve disk, an operator for said stem coaxially secured to the end thereof opposite said exhaust valve seat, said operator comprising a pair of axially spaced flexible diaphragms with a rigid coaxial diaphragm plate therebetween axially secured to the other end of said stem, means for exerting a control air pressure on the outside of said diaphragm away from said stem, means for exerting a reactionary load air pressure on the outside of the diaphragm through which said stem is secured to said plate, axially to position said stem as a differential function of the products on the two opposite sides of said two diaphragms of the air pressures exerted thereon and the effective diameters of said two diaphragms, said effective diameters of said diaphragms being determined by the relative wraps of said diaphragms on said diaphragm plate as the transverse center plane of said center plate is moved axially away from a transverse plane axially midway between the mounting planes of said diaphragms whereby when a control air pressure is exerted on a one of said diaphragms said stem will be moved towards said disk first to close said exhaust valve and then to open said main valve to pass reaction air from a source thereof until said stem is positioned by said reaction air to balance the air pressures on the two sides of the two diaphragms as determined by the axial position of the centerplane of the diaphragm plate with respect to the mid position between the diaphragms.

13. An adjustable differential air pressure relay including in axial alignment a hollow body with a top cover spaced therefrom by a pair of flexible diaphragms axially separated by a hollow diaphragm ring, said cover and the upper one of said diaphragms forming a pilot air chamber open through said cover to a pilot air source, a first transverse barrier means formed across the interior of said hollow body below the lower one of said diaphragms to form with said lower diaphragms a reaction pressure air chamber said hollow body including a lower end cover to form between said lower end cover and said first barrier a valve chamber open at its upper end to said reaction pressure air chamber and at its lower end to a source of reaction air, a hollow valve barrel axially slidably sealed to the interior wall of said valve chamber, valve barrel positioning means slidably sealed through said lower end cover and secured to said valve barrel within said valve chamber, said valve barrel being formed through its top wall with a main valve port having a main valve seat formed downwardly therearound, a main valve disk axially movable in said barrel, means within said barrel resiliently to bias said disk upwardly towards said main valve seat, a hollow valve stem axially slidably sealed near its lower end through said first barrier to extend into said valve barrel through said main valve port, an exhaust valve seat formed downwardly around the lower end of said hollow stem, air conduit means connecting the interior of said stem to atmosphere, a diaphragm plate of the thickness of said ring secured between said diaphragms to the upper end of said stem through said lower diaphragm, the neutral transverse plane of axial symmetry of said plate being midway between the mounting planes of said two diaphragms at which axial position the air pressures in said pilot and said reaction air chambers will wrap said diaphragms over equal diameters of the two sides of said plate and from which axial position movement in either axial direction will increase the effective diameter of the diaphragm on the side of the said plate away from its plane of symmetry, whereby to maintain a desired differential pressure between the air pressures in said first and second air chambers said valve barrel positioning means can be moved axially from outside said hollow body to determine a position of said barrel which will determine a new axial position of said stem at which both said main valve seat and said exhaust valve seat are closed on said main valve disk to maintain a ratio of air pressures in said first and second air chambers inverse to the effective diameters of said upper and lower diaphragms as determined by the air required to pass said main valve to said second air chamber or to pass said exhaust valve from said second air chamber to position said stem to close both said valves.

14. An adjustable differential air pressure relay including in axial alignment: means forming a pilot air chamber for receiving air from a pilot air source; means forming a reaction air chamber axially spaced from said pilot air chamber for receiving air from a reaction air source; means forming a valve chmber having a wall common to the wall of said reaction air chamber on its side opposite said pilot air chamber; a valve barrel axially slidably sealed along the inner wall surface of said valve chamber; means for positioning said valve barrel axially in said valve chamber; a first flexible diaphragm forming the part of the wall of said pilot air chamber adjacent to said reaction air chamber; a second flexible diaphragm forming the similar adjacent wall of said reaction air chamber; a relatively thick diaphragm plate positioned axially between said diaphragms within the flexible areas thereof to move axially therewith; a valve stem secured at one end to said diaphragm plate and said second diaphragm to extend therefrom through said reaction air chamber with its other end slidably sealed through said common wall into said valve chamber and said valve barrel; said valve barrel and said stem including means forming a main valve and an exhaust valve cooperably operable by said stem when its other end enters said barrel first to close said exhaust valve and then to open said main valve to admit reaction air to said reaction air chamber; and said means forming said valve being operable by said stem as its said other end leaves said barrel first to close said main valve and then to open said exhaust valve to exhaust reaction air from said reaction air to atmosphere; whereby when said valve barrel is moved to a selected axial position by said means therefor said stem will be moved responsively thereto axially to position said diaphragm plate with respect to the axial positions of said diaphragms to determine relative effective areas of said diaphragms to cooperate with the air pressures in said two air chambers to give a desired new differential between the air pressure in said pilot air chamber and the air pressure in said reaction air chamber.

15. An adjustable differential air pressure relay comprising in axial alignment, a straight valve stem, means supporting said stem for movement in its alternate axial directions, means forming a pilot air chamber with an open side, means forming a reaction air chamber with an open side similar to said open side of said pilot air chamber, means for supporting said air chambers with said open sides adjacently spaced a selected distance, a pair of flexible diaphragms respectively sealed over said adjacent open sides of said chambers, a diaphragm plate axially the thickness of said selected distance between said two diaphragms and formed on its opposite faces as required to cause the effective diameters of said two diaphragms to vary oppositely as said plate is moved in either axial direction with said diaphragms while said chambers are filled with said pilot air and said reaction air respectively, means securing said plate hermetically to one end of said stem through one of said diaphragms, means including the other end of said stem forming a main air valve and an exhaust air valve operable by said stem when said stem is moved in one of its alternate axial directions first to close one of said valves and then to open the other of said valves, means opening said pilot air chamber to a source of pilot air, means opening said reaction air chamber to a source of reaction air, means including said main valve when said main valve is opened by movement of said stem in one direction to pass air from a source of higher pressure air to said reaction air chamber, means including said exhaust valve when said exhaust valve is opened by movement of said stem in the other direction to pass air from said reaction chamber to the atmosphere, whereby when the product of the air pressure in said pilot air chamber and the effective area of its diaphragm is greater than the product of the air pressure in said reaction air chamber and the effective area of its diaphragm, said diaphragm plate with said stem will be moved in the direction to close said exhaust valve and open said main valve to increase the reaction pressure in said reaction air chamber until the products of the air pressures and the effective areas of the diaphragms in the respective air chambers will balance to stop the movement of said stem where both said valves are closed and the air pressures in said chambers are in inverse ratio to the effective areas of said diaphragms.

16. For use in an air brake system for an automotive train, a differential pressure air relay including in an axial line a main valve, an exhaust valve and a valve stem, said valves being overlappingly operable by one end of said stem on movement of said stem in one direction first to close one of said valves and then to open the other and in the other direction first to close the other of said valves and then to open the one, said relay including a pair of parallel supported spaced diaphragms with a parallel spaced diaphragm plate secured therebetween to move axially therewith in response to the differential of the opposed pressures applied to the opposite faces of said diaphragm plate by the outer faces of said diaphragms and means securing said plate to the other end of said stem to operate said valves to maintain said differential; said relay including an axially moveable valve barrel in the interior of which the disk of said exhaust valve is fixed face upwardly thereto and the disk of said main valve is fixed face upwardly thereto while said exhaust valve seat is formed on the valve disk facing end of said valve stem movable by said plate and the downwardly facing main valve seat is positioned within said valve barrel over said main valve disk and axially secured in said relay with respect to said diaphragm plate to fix the pressure differential of the air in the spaces on the two outsides of said diaphragms.

17. For use in an air brake system for an automotive train, a differential pressure air relay including in an axial line a main valve, an exhaust valve and a valve stem, said valves being overlappingly operable by one end of said stem on movement of said stem in one direction first to close one of said valves and then to open the other and in the other direction first to close the other of said valves and then to open the one, said relay including a pair of parallel supported spaced diaphragms with a parallel spaced diaphragm plate secured therebetween to move axially therewith in response to the differential of the opposing pressures applied to the opposite faces of said diaphragm plate by the outer faces of said diaphragms and means securing said plate to the other end of said stem to operate said valves to maintain said differential, said relay including an axially movable valve barrel formed through its top wall with a main valve port having a main valve seat downwardly formed therearound, a main valve disk resiliently biased upwardly toward said main valve seat within said barrel, said exhaust valve seat being formed on the lower end of said stem to enter said barrel through said main valve port, said exhaust valve disk being a reduced area of said main valve disk and said barrel being axially positionable in said relay with respect to said plate to fix said air pressure differential.

References Cited in the file of this patent

UNITED STATES PATENTS

| | | |
|---|---|---|
| 1,903,338 | Horne | Apr. 4, 1933 |
| 2,313,991 | Fitch | Mar. 16, 1943 |
| 2,411,406 | Affleck | Nov. 19, 1946 |
| 2,880,754 | Williams et al. | Apr. 7, 1959 |